United States Patent

Amamori et al.

[11] Patent Number: 5,405,163
[45] Date of Patent: Apr. 11, 1995

[54] ENERGY ABSORBING AIR BAG CONTAINER

[75] Inventors: Ichiro Amamori; Akira Kokeguchi, both of Shiga, Japan

[73] Assignee: Takata Corporation, Tokyo, Japan

[21] Appl. No.: 128,141

[22] Filed: Sep. 29, 1993

[30] Foreign Application Priority Data

Oct. 16, 1992 [JP] Japan .................. 4-278488

[51] Int. Cl.⁶ .......................... B60R 21/20
[52] U.S. Cl. .................. 280/728 A; 280/738
[58] Field of Search .......... 280/728 A, 731, 732, 280/743 R, 752, 738, 730 R, 728 R

[56] References Cited

U.S. PATENT DOCUMENTS

| | | | |
|---|---|---|---|
| 3,938,826 | 2/1976 | Giorgini et al. | 280/738 |
| 4,949,990 | 8/1990 | Hirahara et al. | 280/752 |
| 5,100,172 | 3/1992 | Van Voorhies et al. | 280/738 |
| 5,190,314 | 3/1993 | Takasugi | 280/752 |
| 5,209,519 | 5/1993 | Shiga et al. | 280/728 A |
| 5,342,082 | 8/1994 | Kriska et al. | 280/728 A |

FOREIGN PATENT DOCUMENTS

| | | | |
|---|---|---|---|
| 0155855 | 6/1990 | Japan | 280/728 A |
| 0306846 | 12/1990 | Japan | 280/728 A |
| 4166458 | 6/1992 | Japan | 280/728 A |
| 1303567 | 1/1973 | United Kingdom . | |
| 1358364 | 7/1974 | United Kingdom . | |
| 1479104 | 7/1977 | United Kingdom . | |
| 2262071 | 6/1993 | United Kingdom | 280/728 A |
| 2265337A | 9/1993 | United Kingdom . | |

*Primary Examiner*—Margaret A. Focarino
*Assistant Examiner*—Peter C. English
*Attorney, Agent, or Firm*—Kanesaka & Takeuchi

[57] ABSTRACT

An air bag device for a vehicular passenger is formed of a box-shaped container having an open front face; an air bag confined in a folded shape in the container; an inflator attached to the container; and a lid covering the front face of the container. Further, a stress concentration portion is formed in the container for starting the buckling deformation of the container when an impact is applied to the container from the front.

3 Claims, 4 Drawing Sheets

5,405,163

ENERGY ABSORBING AIR BAG CONTAINER

BACKGROUND OF THE INVENTION

1. Field of the Invention

The present invention relates to an air bag device which is mounted in the instrument panel of a vehicle for extending an air bag to protect a passenger at the time of a collision of the vehicle.

2. Description of the Related Art

In the air bag device for a vehicular passenger, a folded air bag and an inflator are confined in a box-shaped container, and a lid is so attached to the container as to cover the air bag. When the vehicle collides, the inflator operates to extend the air bag largely into the cabin thereby to protect the passenger.

The instrument panel is regulated by the Law (i.e., the regulations of the instrument panel against an impact) to have characteristics, in which it is deformed or recessed, when impacted, so as to absorb the impact coming from the hit of a passenger. The air bag device for a vehicular passenger also has to clear these instrument panel impact regulations.

The container of the air bag device for a vehicular passenger has to be deformed to satisfy the instrument panel impact regulations. Against an impact lower than a predetermined value, the lid or container is required to have a sufficient strength and an excellent durability. Thus, the air bag device is improper if the lid or container is made so fragile as to clear merely the instrument panel impact regulations.

OBJECT AND SUMMARY OF THE INVENTION

The present invention has an object to provide an air bag device for a vehicular passenger, which has a container having a sufficient strength and capable of absorbing an impact applied to the instrument panel sufficiently.

According to the present invention, there is provided an air bag device for a vehicular passenger, which comprises: a box-shaped container having an open front face; an air bag confined in a folded shape in said container; an inflator attached to said container; and a lid covering the front face of said container, wherein the improvement comprises a stress concentration portion for starting the buckling deformation of said container when an impact is applied to said container from the front.

In the air bag device for a vehicular passenger according to the present invention, if a strong impact is applied to the container from the front, the resultant stress is concentrated in the stress concentration portion to start the buckling deformation from that portion. Thus, the impact is absorbed by the buckling deformation of the container.

DESCRIPTION OF THE PREFERRED EMBODIMENTS

The present invention will be described in the following in connection with its embodiments with reference to the accompanying drawings.

Figure 1:
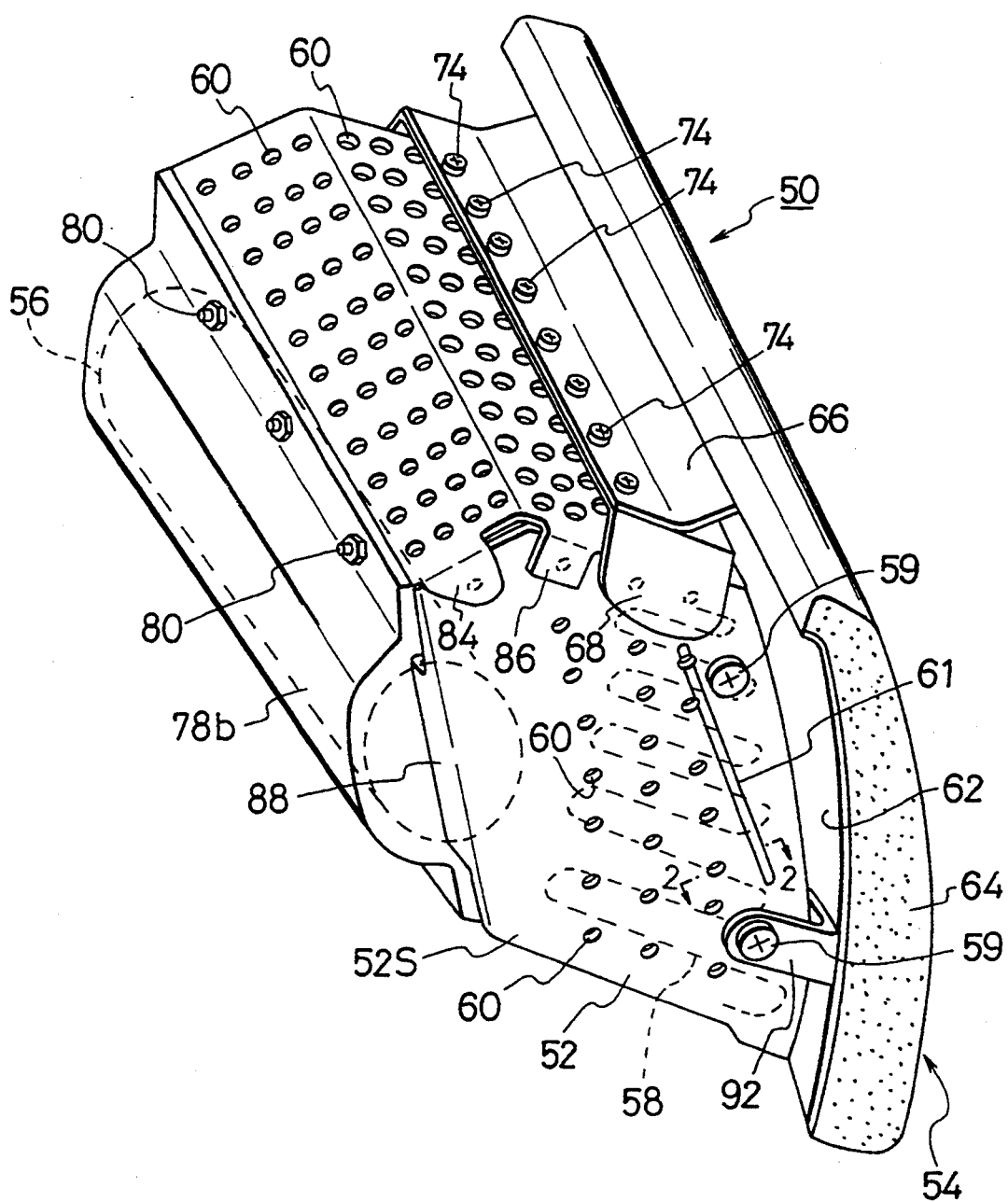
FIG. 1 is a perspective view showing an air bag device for a vehicular passenger according to an embodiment of the present invention.
Figure 2:
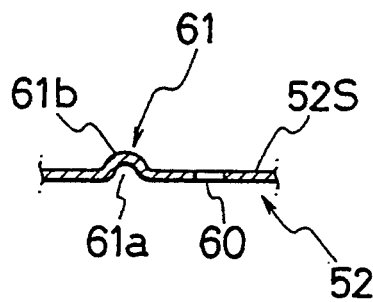
FIG. 2 is a section view taken along a line 2—2 of FIG. 1.
Figure 3:
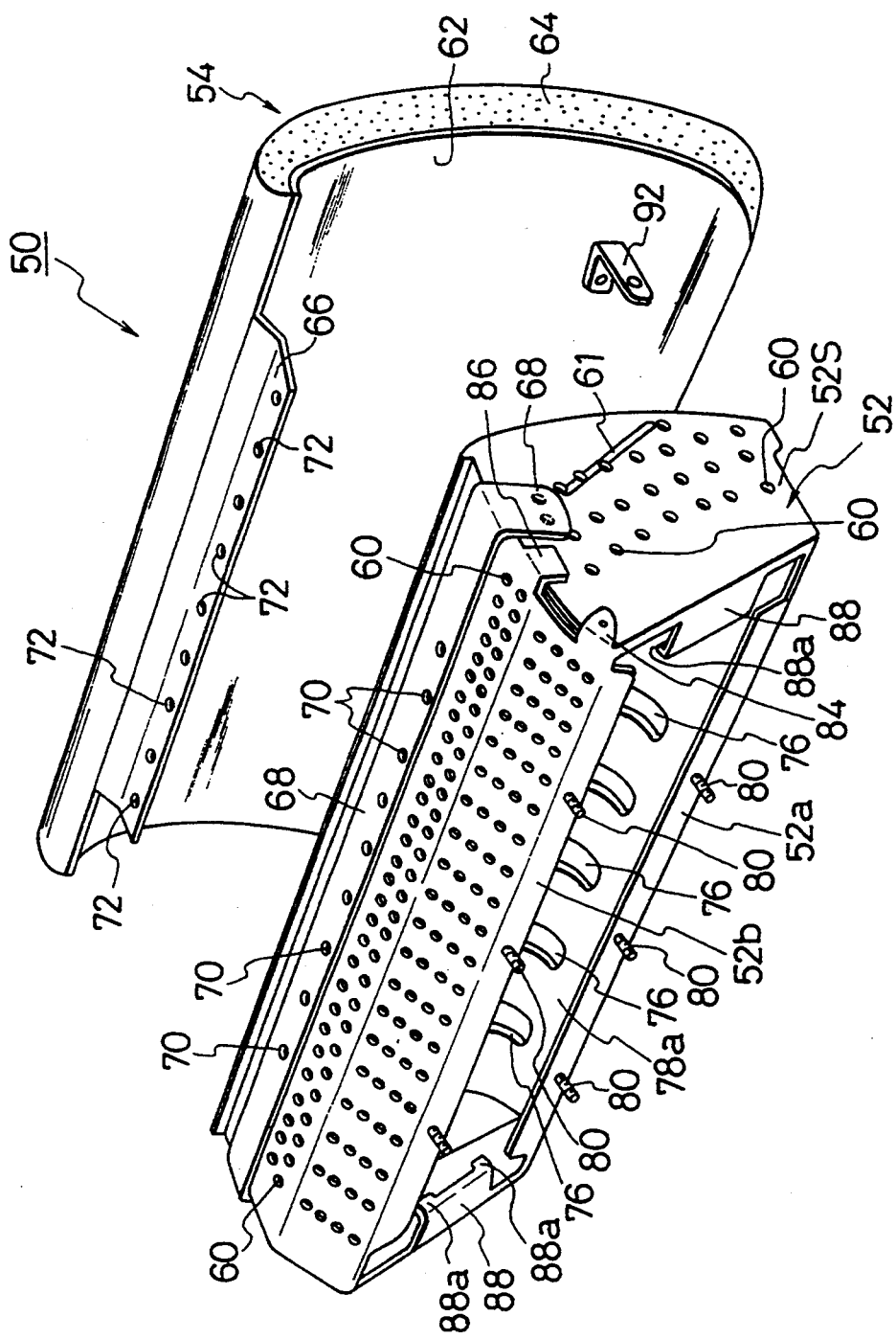
FIG. 3 is an exploded perspective view showing the device of the embodiment.

FIGS. 1 to 3 show an air bag device according to an embodiment, wherein FIG. 1 is a perspective view showing an overall structure; FIG. 2 is a section view taken along a line 2—2 of FIG. 1; and FIG. 3 is an exploded perspective view.

In this air bag device, as generally designated at 50, a lid 54 is attached to the open front face of a box-shaped container 52. An inflator 56 is fixed in the container 52. An air bag 58 is fitted in a folded shape in the container 52, to which the lid 54 is fixed by means of bolts 59.

The container 52 is formed individually in its upper, side and lower faces with a number of aspiration holes 60. When the inflator 56 operates to inject its gases into the container 52 to inflate the air bag 58, the air flows into the container 52 through those aspiration holes 60 to extend the air bag 58 quickly.

This container 52 is formed in its side faces 52S with stress concentration portions 61 in a straight shape. These stress concentration portions 61 are formed by pressing the side faces 52S to form grooves 61a and ridges 61b, as shown in FIG. 2. The grooves 61a are formed in the inner face of the container 52 but may be formed in the outer face. However, the grooves 61a may preferably be formed in the container inner face, as shown, so as to reduce the possible friction with the air bag.

The stress concentration portions 61 may preferably extend parallel to or at a small angle with respect to the front edge of the container 52. This small angle of intersection between the stress concentration portions 61 and the front edge of the container 52 may preferably be within 45 degrees.

The lid 54 is composed of a backup plate 62 made of an aluminum alloy and a soft cover 64 covering the front face of the plate 62. This plate 62 has its upper edge extended upward of the container 52 to provide a lid mount 66.

To the upper face of the container 52, there is spot-welded a lid mounting bracket 68. This lid mounting bracket 68 is extended along the upper face of the container 52 and is formed with a number of bolt holes 70. The lid mount 66 is also formed with a number of corresponding bolt holes 72. Thus, the lid mount 66 is fixed on the lid mounting bracket 68 by means of bolts 74 and nuts.

As shown in FIGS. 1 and 3, the container 52 has its back face composed of first and second back plates 78a and 78b. These back plates 78a and 78b are recessed to receive the inflator 56. Moreover, the first back plate 78a is slitted at 76 for introducing the injected gases of the inflator 56 into the container 52.

The first and second back plates 78a and 78b are fixed to the flaps 52a and 52b of the container 52 by means of bolts 80. These bolts 80 are anchored at the first back plate 78a and extend through the bolt holes of the flaps 52a and 52b and the second back plate 78b.

The container 52 thus constructed is formed generally into a shape of letter "U" by punching a metal sheet and bending its bottom face, two side faces 52S and flap 52a. The upper face of the container 52 is formed integrally with the flap 52b by punching and subsequently folding a metal sheet. This upper face has its side ears 84 and 86 spot-welded to the side faces 52S.

The side faces 52S of the container 52 are formed at their rear edges with L-shaped hooks 88. These hooks 88 have their front ends 88a inserted into slits which are formed in the side faces of the first back plate 78a, so that the hooks 88 are retained in the back plate 78a.

Numeral 92 designates connecting members connecting the lower ends of the lid 54 and the container 52. These connecting members 92 are broken, when the lid 54 is opened, to allow the lower end of the lid 54 to turn up.

In the air bag device for a vehicular passenger thus constructed, when an impact is applied from the front of the container 52, the resultant stress is concentrated at the stress concentration portions 61 of the container 52 so that the portions 61 are deformed to bulge sideways of the container 52. As a result, the overall deformation (i.e., a crushed deformation) of the container 52 quickly progresses to absorb the applied impact sufficiently.

If, however, the applied impact is weak, the container 52 does not undergo any deformation to improve the durability of the air bag device.

In the embodiment described above, the container side faces 52S are formed with the stress concentration portions 61. However, these portions 61 may be formed either in the upper or bottom face of the container 52 of FIG. 1 or in the lid mounting bracket 68.

Figure 4:
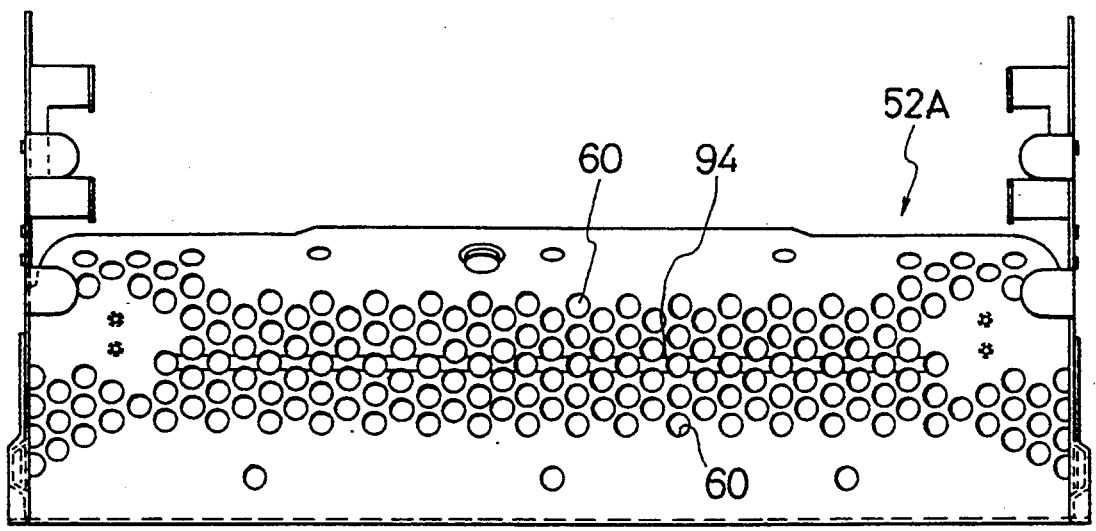
FIG. 4 is a bottom view showing a container 52A according to another embodiment.
Figure 5:
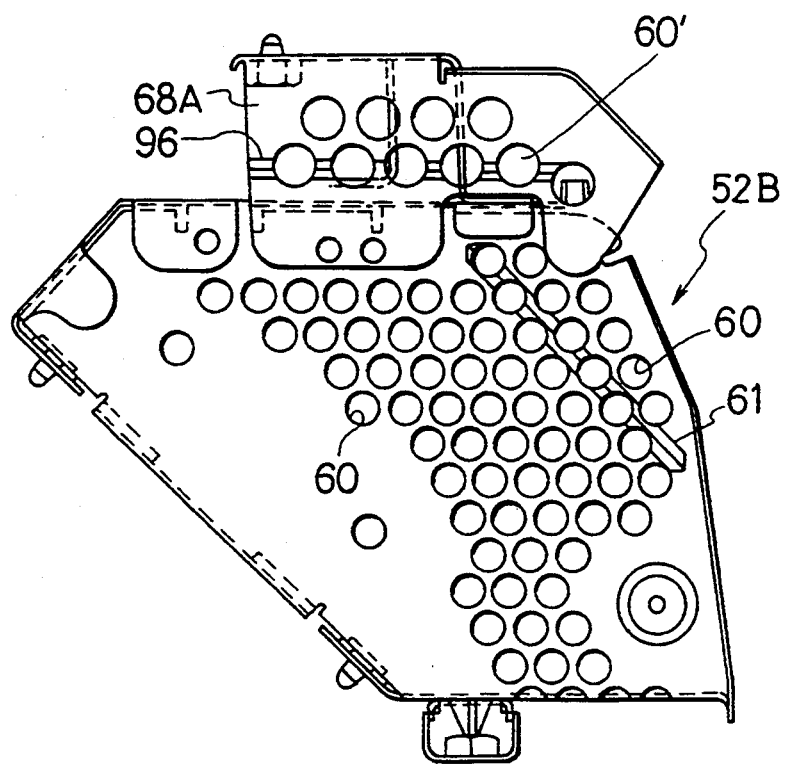
FIG. 5 is a side elevation showing a container 52B according to still another embodiment.

These modifications are shown in FIGS. 4 and 5. FIG. 4 is a bottom view showing a container 52A which is formed in its lower face with a stress concentration portion 94 in a straight shape. This stress concentration portion 94 extends parallel to the front edge of the container 52A. On the other hand, FIG. 5 is a side elevation showing a container 52B which is formed with aspiration holes 60' and a stress concentration portion 96 in a straight shape in a side face of a lid mounting bracket 68A.

In the above described embodiments, the container 52 is formed with a number of aspiration holes 60. As a result, if the container 52 starts its buckling from the stress concentration portion or portions 61, the container 52 is easily crushed as a whole so that it can absorb much impact energy in its entirety.

As described above, in the air bag device for a vehicular passenger according to the present invention, when an impact stronger than a predetermined level is applied to the container from the inside of the cabin, the container can be quickly deformed to absorb the impact efficiently. If the impact applied is weaker than the predetermined level, on the other hand, the container does not undergo any deformation to impart a sufficiently high durability to the air bag device.

What is claimed is:

1. An air bag device for a passenger, comprising:
a rectangular container having an open front face, two side portions, and upper and lower portions, said side portions and upper and lower portions surrounding the open front face,
an air bag confined in a folded shape in said container,
an inflator attached to said container,
a lid attached to said container for covering the open front face,
a plurality of aspiration holes formed in at least said side portions of the container for allowing air to enter into said container therethrough when said air bag is deployed upon actuation of the inflator, and
stress concentration portions formed in the side portions, each stress concentration portion being formed of a curved ridge protruding outwardly from each side portion of the container and a groove located at a back of the curved ridge and facing an inside of the container to prevent friction between the curved ridge and the air bag, each stress concentration portion extending linearly across the aspiration holes and being disposed near the lid to incline upwardly with an angle less than 45 degrees relative to the lid so that each stress concentration portion starts from a portion near the lid at a predetermined distance away from the lower portion of the container and an edge of the open front face to a portion near and at a predetermined distance away from the upper portion of the container, so that when an upper portion of the lid is pressed only more than a predetermined pressure, the side portions of the container bend along the stress concentration portions to expand laterally outwardly of the container to thereby absorb pressure applied to the lid.

2. An air bag device for a passenger according to claim 1, further comprising a lid mounting bracket having side portions and an upper portion between the side portions, said side portions of the lid mounting bracket being fixed to the side portions of the container and having a plurality of aspiration holes and second stress concentration portions extending across the aspiration holes in the side portions of the lid mounting bracket parallel to the upper portion of the container to absorb pressure applied thereto.

3. An air bag device for a passenger, comprising:
a rectangular container having an open front face, two side portions, and upper and lower portions, said side portions and upper and lower portions surrounding the open front face,
an air bag confined in a folded shape in said container,
an inflator attached to said container,
a lid attached to said container for covering the open front face,
a plurality of aspiration holes formed in at least said side portions of the container for allowing air to enter into said container therethrough when said air bag is deployed upon actuation of the inflator,
stress concentration portions formed in the side portions, each stress concentration portion being formed of a curved ridge and a groove at a back of the ridge so that the curved ridge protrudes outwardly from the respective side portion of the container and the groove is located inside the container to reduce friction with the air bag, said stress concentration portions extending linearly across the aspiration holes and being disposed near the lid substantially parallel thereto so that when the lid is pressed more than a predetermined pressure, the side portions of the container bend along the stress concentration portions to expand outwardly to thereby absorb pressure applied to the lid, and
a lid mounting bracket having side portions and an upper portion between the side portions thereof, said side portions of the lid mounting bracket being fixed to the side portions of the container and having a plurality of aspiration holes and second stress concentration portions extending across the aspiration holes in the side portions of the lid mounting bracket parallel to the upper portion of the container to absorb pressure applied thereto.

* * * * *